(12) United States Patent
Kienitz et al.

(10) Patent No.: US 10,872,524 B2
(45) Date of Patent: Dec. 22, 2020

(54) METHOD AND DEVICE FOR OPERATING A TRAFFIC MONITORING DEVICE, TRAFFIC MONITORING DEVICE, AND TRAFFIC MONITORING SYSTEM

(71) Applicant: JENOPTIK Robot GmbH, Monheim (DE)

(72) Inventors: Stefan Kienitz, Duisburg (DE); Katrin Wirz, Solingen (DE); Siegrun Reis, Solingen (DE); Martin Schroeder, Monheim (DE); Lars Ole Keller, Ratingen (DE)

(73) Assignee: JENOPTIK Robot GmbH, Monheim am Rhein (DE)

( * ) Notice: Subject to any disclaimer, the term of this patent is extended or adjusted under 35 U.S.C. 154(b) by 6 days.

(21) Appl. No.: 16/042,390

(22) Filed: Jul. 23, 2018

(65) Prior Publication Data
US 2018/0350230 A1 Dec. 6, 2018

Related U.S. Application Data

(63) Continuation of application No. PCT/EP2017/051226, filed on Jan. 20, 2017.

(30) Foreign Application Priority Data

Jan. 21, 2016 (DE) .......... 10 2016 000 532

(51) Int. Cl.
*G08G 1/01* (2006.01)
*G08G 1/054* (2006.01)
(Continued)

(52) U.S. Cl.
CPC ......... *G08G 1/0116* (2013.01); *G06K 9/3258* (2013.01); *G08G 1/0112* (2013.01);
(Continued)

(58) Field of Classification Search
CPC .. G06K 9/3258; G08G 1/0112; G08G 1/0116; G08G 1/0175; G08G 1/054;
(Continued)

(56) References Cited

U.S. PATENT DOCUMENTS 5,590,217 A * 12/1996 Toyama ............... G06K 9/46
348/149
5,948,038 A * 9/1999 Daly ................... G08G 1/04
340/933

(Continued)

FOREIGN PATENT DOCUMENTS

CN 102446415 A 5/2012
CN 102708693 A 10/2012
(Continued)

OTHER PUBLICATIONS

International Preliminary Report on Patentability (IPRP) for PCT Application No. PCT/EP2017/051226 dated Jan. 21, 2018—English translation.

*Primary Examiner* — Babar Sarwar
(74) *Attorney, Agent, or Firm* — Muncy, Geissler, Olds & Lowe, P.C.

(57) ABSTRACT

A method for operating a traffic monitoring device. A sensor signal is provided by a sensor device of the traffic monitoring device is first of all read in. An item of information is then generated using the sensor signal. Finally, the information is output to an interface to at least one vehicle.

11 Claims, 7 Drawing Sheets

(51) Int. Cl.
  *G08G 1/0967* (2006.01)
  *G08G 1/09* (2006.01)
  *G08G 1/017* (2006.01)
  *H04W 4/46* (2018.01)
  *H04W 4/44* (2018.01)
  *G06K 9/32* (2006.01)

(52) U.S. Cl.
  CPC ............ *G08G 1/0175* (2013.01); *G08G 1/054* (2013.01); *G08G 1/092* (2013.01); *G08G 1/096708* (2013.01); *G08G 1/096741* (2013.01); *G08G 1/096783* (2013.01); *H04W 4/44* (2018.02); *H04W 4/46* (2018.02)

(58) Field of Classification Search
  CPC ............ G08G 1/092; G08G 1/096708; G08G 1/096741; G08G 1/096783; H04W 4/44; H04W 4/46
  See application file for complete search history.

(56) References Cited

U.S. PATENT DOCUMENTS

| | | | | |
|---|---|---|---|---|
| 6,081,206 | A * | 6/2000 | Kielland | G06Q 30/0284 194/902 |
| 6,111,523 | A * | 8/2000 | Mee | G08G 1/054 340/936 |
| 6,140,941 | A * | 10/2000 | Dwyer | G07B 15/063 235/384 |
| 6,538,580 | B2 * | 3/2003 | Bostrom | G07B 15/063 340/933 |
| 6,754,368 | B1 * | 6/2004 | Cohen | G01S 13/70 382/103 |
| 7,227,974 | B2 * | 6/2007 | Kamijo | G08G 1/0175 382/103 |
| 8,055,204 | B2 * | 11/2011 | Livsics | H04B 1/719 455/67.11 |
| 9,594,158 | B2 * | 3/2017 | Abl | G01S 13/867 |
| 9,685,084 | B2 | 6/2017 | Scholl et al. | |
| 9,853,729 | B2 | 12/2017 | Endo | |
| 2002/0141618 | A1 * | 10/2002 | Ciolli | G08G 1/20 382/104 |
| 2002/0167588 | A1 * | 11/2002 | Kamijo | G08G 1/0962 348/135 |
| 2002/0186148 | A1 * | 12/2002 | Trajkovic | G08G 1/0175 340/936 |
| 2004/0218052 | A1 * | 11/2004 | DiDomenico | G08G 1/054 348/207.99 |
| 2010/0302362 | A1 * | 12/2010 | Birchbauer | G08G 1/054 348/135 |
| 2011/0313644 | A1 * | 12/2011 | Grassi | G08G 1/054 701/119 |
| 2013/0038681 | A1 * | 2/2013 | Osipov | G08G 1/054 348/36 |
| 2014/0172283 | A1 * | 6/2014 | Ho | G08G 1/0133 701/119 |
| 2018/0350230 | A1 * | 12/2018 | Kienitz | G08G 1/0116 |

FOREIGN PATENT DOCUMENTS

| | | |
|---|---|---|
| CN | 103454660 A | 12/2013 |
| CN | 104882002 A | 9/2015 |
| DE | 10 2005 035 242 A1 | 2/2007 |
| EP | 1 256 917 A2 | 11/2002 |
| EP | 2 701 133 B1 | 11/2015 |
| KR | 10-2015-0138055 A | 12/2015 |

* cited by examiner

METHOD AND DEVICE FOR OPERATING A TRAFFIC MONITORING DEVICE, TRAFFIC MONITORING DEVICE, AND TRAFFIC MONITORING SYSTEM

This nonprovisional application is a continuation of International Application No. PCT/EP2017/051226, which was filed on Jan. 20, 2017, and which claims priority to German Patent Application No. 10 2016 000 532.7, which was filed in Germany on Jan. 21, 2016, and which are both herein incorporated by reference.

BACKGROUND OF THE INVENTION

Field of the Invention

The present invention relates to a method for operating a traffic monitoring device, to a corresponding apparatus, to a traffic monitoring device and to a traffic monitoring system. The present invention also relates to a computer program.

Description of the Background Art

US 2014/0172283 A1 describes a method for determining and transmitting an average speed of a vehicle.

DE 10 2005 035 242 A1 describes a multipurpose traffic monitoring system in which data are interchanged between the vehicle and the traffic monitoring system itself.

EP2 7001 133 B1 describes a method and an apparatus for recording an image of a speeding vehicle.

SUMMARY OF THE INVENTION

It is therefore an object of the present invention to provide a method for operating a traffic monitoring device, an apparatus which uses this method, a traffic monitoring device, a traffic monitoring system and a computer program for carrying out the method according to the main claims.

A method for operating a traffic monitoring device is presented, wherein the method comprises the following steps of: reading in at least one sensor signal provided by a sensor device of the traffic monitoring device; interchanging an at least temporarily unique, encrypted object identifier of a vehicle between a vehicle interface and an interface of the traffic monitoring device and interchanging keys; generating an item of information using the sensor signal; and outputting the information to an interface to the vehicle and/or a computer unit.

A traffic monitoring device can be understood as meaning a mobile or stationary device for capturing a vehicle. Particularly preferred examples are formed by traffic monitoring devices in the form of route or region monitoring, for instance section control or point-to-point monitoring, or the monitoring of traffic-light-controlled intersection regions. For example, the traffic monitoring device may be designed to capture a speed or a weight of the vehicle or a distance between the vehicle and at least one other vehicle. The sensor unit may comprise, for example, a camera, a speed sensor, a weight sensor or a module for detecting a license plate number of the vehicle or a module for capturing or processing locating signals from any desired signal sources of modern vehicles, for example WLAN, GSM systems, Bluetooth transmitters (MAC etc.), tire pressure sensors. The information may be, for example, a warning, an image or an image sequence of the vehicle or another notification to a driver of the vehicle, wherein the image or the image sequences may have been recorded by the traffic monitoring device, for instance. The information may be wirelessly transmitted to the vehicle, for example, via a WLAN, Bluetooth or mobile radio connection.

The approach proposed here is based on the knowledge that integrating a suitable data transmission unit in a traffic monitoring device makes it possible to interchange information between the traffic monitoring device and at least one vehicle. In this case, the traffic monitoring device can communicate with the vehicle via car-to-car or environment-to-car communication, for example, which may be advantageous, in particular, in connection with point-to-point measurements. On the one hand, the communication between traffic monitoring and road users can be improved by using such a traffic monitoring device; on the other hand, the traffic safety can be increased as a result.

The approach proposed here can be used to prevent a traffic monitoring system from transmitting sensitive data relevant to data protection, for instance an actual speed difference to the permitted limit in combination with a motor vehicle license plate number, to unauthorized third parties. In this respect, security-relevant data and keys can be interchanged between the vehicle and the traffic monitoring system, wherein an object identifier can be effected using further signals or identifiers, rather than an unencrypted license plate number.

According to an embodiment, in the reading-in step, a signal representing a speed of the vehicle, a weight of the vehicle, a distance between the vehicle and at least one other vehicle, an image representing the vehicle and/or a driver of the vehicle, a license plate number of the vehicle, a classification of the vehicle or a combination of at least two of said signal sources or features can be read in as the sensor signal. As a result of this embodiment, the information can be generated on the basis of the speed, the weight, the distance, the image, the license plate number or the classification.

According to the invention, the method comprises a step of assigning the license plate number and/or the further signal source to at least one local language using the sensor signal. In this case, the information can be generated on the basis of the local language in the generating step. This has the advantage that the information can be generated in a local language corresponding to the license plate number or the further signal source. In another embodiment, the generating step may comprise outputting the information in a further, second local language. The second local language may be, for example, English or the local language of the country in which the traffic monitoring device is constructed.

It is also advantageous if an image, an image sequence or a warning or a combination of at least two of said elements is generated as the information in the generating step. The image or the image sequence may be, for example, a recording of the vehicle created during traffic monitoring. The warning may be, for instance, a notification relating to a committed or possibly imminent traffic regulation violation by the vehicle, a traffic volume or the course of a route or another notification relevant to traffic safety. As a result of this embodiment, the driver can be warned by means of the traffic monitoring device.

Furthermore, a control signal for controlling the vehicle can also be generated in the generating step using the sensor signal. In this case, the control signal can also be output to the interface in the outputting step. The control signal may be, for example, a signal for controlling an engine or steering and braking actuators of the vehicle. As a result of this embodiment, the vehicle can be controlled by means of the traffic monitoring device.

According to an embodiment, the information can be output to the interface in the outputting step in order to transmit the information to at least one further traffic monitoring device and/or at least one external data transmission device. Additionally or alternatively, at least one signal provided by the vehicle, the further traffic monitoring device or the external data transmission device can also be read in in the reading-in step. Accordingly, the information can also be generated using the signal in the generating step. An external data transmission device can be understood as meaning, for example, a repeater or a base station, for instance in the form of a mobile radio antenna. The further traffic monitoring device may be, for example, a mobile or stationary device for measuring the speed, weight or distance or for monitoring traffic lights. As a result of this embodiment, the information can be provided with a high degree of accuracy and reliability.

In this case, the method may comprise a step of comparing the signal with the sensor signal in order to determine a difference between the signal and the sensor signal. The information can be generated on the basis of the difference in the generating step. As a result of this embodiment, the signal can be calibrated on the basis of the sensor signal. For example, this embodiment makes it possible to calibrate a tachometer of the vehicle on the basis of the sensor signal which can represent a speed measurement which has been carried out by means of the traffic monitoring device and has therefore been accordingly calibrated. Depending on the embodiment, further calibrated information, for example, can be provided by the traffic monitoring device for the purpose of calibrating the vehicle. This makes it possible to close information gaps.

According to an embodiment, at least one further sensor signal provided by the sensor device can be read in in the reading-in step. At least one further item of information can be generated in the generating step using the further sensor signal. Accordingly, the further information can be output to the interface in the outputting step in order to transmit the further information to at least one further vehicle. This embodiment makes it possible to transmit data between a plurality of vehicles and the traffic monitoring device.

The approach presented here also provides an apparatus which is designed to carry out, control or implement the steps of a variant of a method presented here in corresponding devices. This embodiment variant of the invention in the form of an apparatus can also quickly and efficiently achieve the object on which the invention is based.

In the present case, an apparatus can be understood as meaning an electrical device which processes sensor signals and outputs control and/or data signals on the basis thereof. The apparatus may have an interface which can be designed using hardware and/or software. In the case of a hardware design, the interfaces may be, for example, part of a so-called system ASIC which comprises a wide variety of functions of the apparatus. However, it is also possible for the interfaces to be separate, integrated circuits or to at least partially be formed of discrete components. In the case of a software design, the interfaces may be software modules which are present on a microcontroller, for example, in addition to other software modules.

The approach presented here also provides a traffic monitoring device having the following features: a sensor device for capturing at least one vehicle; and an apparatus according to an embodiment above.

The approach presented here also relates to a traffic monitoring system having the following features: a traffic monitoring device according to an embodiment above; and at least one vehicle which is coupled to the traffic monitoring device via an interface for transmitting the information.

A computer program product having program code which can be stored on a machine-readable carrier such as a semiconductor memory, a hard disk memory or an optical memory and is used to carry out the method according to one of the embodiments described above when the program product is executed on a computer or an apparatus is also advantageous.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
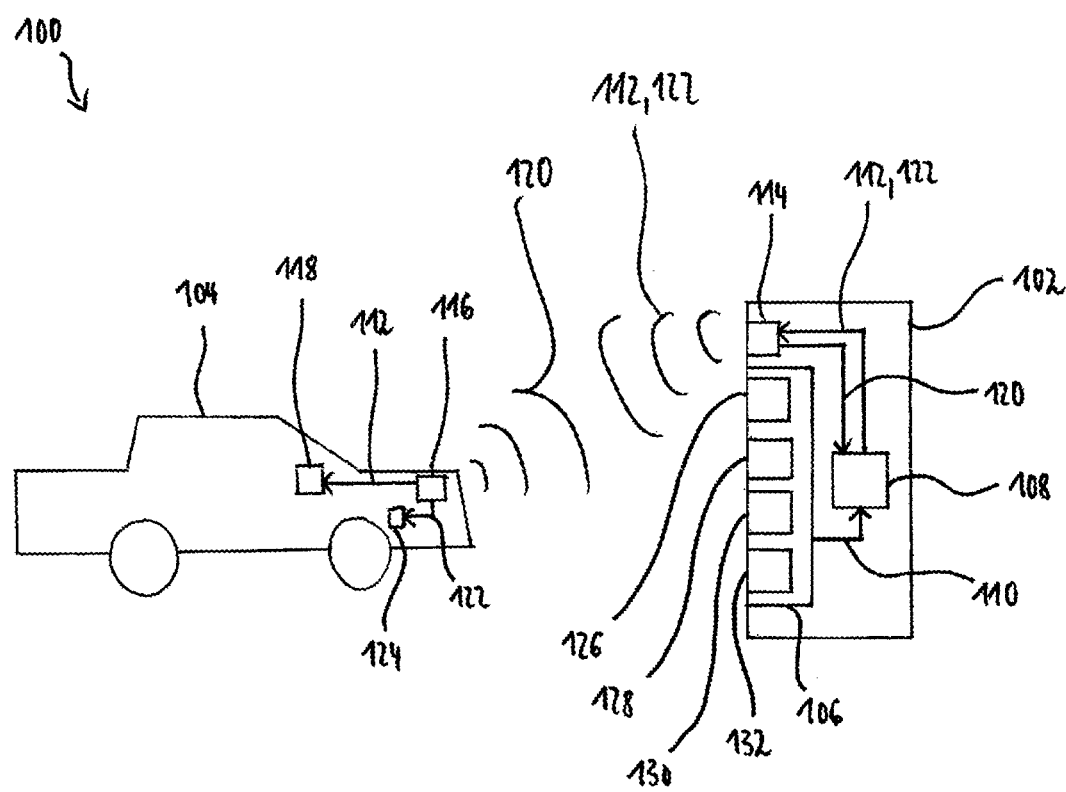
FIG. 1 shows a schematic illustration of a traffic monitoring system according to an exemplary embodiment.

FIG. 1 shows a schematic illustration of a traffic monitoring system 100 according to an exemplary embodiment. The traffic monitoring system 100 comprises a traffic monitoring device 102, here a stationary traffic monitoring device, which is installed at the edge of a road for example, and a vehicle 104. The traffic monitoring device 102 is implemented with a sensor device 106 and an apparatus 108. The sensor device 106 is designed to capture the vehicle 104. In this case, the sensor device 106 generates a sensor signal 110 representing the vehicle and outputs it to the apparatus 108. The apparatus 108 is designed to generate an item of information 112, for instance a warning or an image or an image sequence of the vehicle 104 or its driver, using the sensor signal 110 and to transmit said information to the vehicle 104 via an interface 114. The interface 114 is, for example, a transmitting and receiving unit for infrastructure-to-vehicle, vehicle-to-infrastructure or infrastructure-to-infrastructure communication which is integrated in the traffic monitoring device 102. The interface 114 is optionally implemented with an amplification unit for vehicle-to-vehicle communication.

Depending on the exemplary embodiment, the sensor device 106 is designed to capture a speed or a weight of the vehicle 104 or an image of the vehicle 104 or its driver and to transmit it to the apparatus 108 in the form of the sensor signal 110. Alternatively or additionally, the sensor signal 110 represents a license plate number of the vehicle 104 which is detected by the sensor device 106. In this case, the apparatus 108 is optionally designed to assign the license plate number to at least one particular local language using the sensor signal 110. Accordingly, the apparatus 108 generates the information 112 in the local language assigned to the license plate number, for example.

According to the exemplary embodiment shown in FIG. 1, the vehicle 104 is implemented with a vehicle interface 116 in the form of a vehicle transmitting and receiving unit. The vehicle interface 116 is designed to receive the information 112 provided by the traffic monitoring device 102 and to forward it, here to a display device 118 of the vehicle 104. The display device 118 is designed to reproduce the information 112 in the vehicle 104.

According to an exemplary embodiment, the vehicle interface 116 is designed to transmit a vehicle signal 120, which represents, for example, a speed or a weight of the vehicle 104 or other sensor data captured by sensors of the vehicle 104, to the interface 114 which forwards the vehicle signal 120 to the apparatus 108. The apparatus 108 uses the vehicle signal 120, in addition to the sensor signal 110, to generate the information 112. Optionally, the apparatus 108 compares the vehicle signal 120 and the sensor signal 110 in order to determine a difference between the two signals, wherein the information 112 is generated on the basis of the difference. This makes it possible, for example, to calibrate the vehicle signal 120 on the basis of the sensor signal 110 or conversely to calibrate the sensor signal 110 on the basis of the vehicle signal 120.

It is also conceivable for the apparatus 108 to generate a control signal 122 for controlling the vehicle 104 using the sensor signal 110 and to transmit said control signal to the vehicle interface 116 via the interface 114. In this case, the vehicle interface 116 forwards the control signal 122 to a control device 124 of the vehicle 104, for instance to an engine control device. The control device 124 is designed to control the vehicle 104 using the control signal 122. Optionally, the apparatus 108 is designed to also generate the control signal 122 using the vehicle signal 120.

In FIG. 1, the traffic monitoring device 102 is realized in the form of a so-called TraffiTower, for example. In this case, the sensor device 106 is implemented with a speed sensor 126 for capturing the speed of the vehicle 104, a weight sensor 128 for capturing the weight of the vehicle 104, a camera 130 with a lighting unit or flash for capturing an image or an image sequence of the vehicle 104 and a signal source processing or license plate number recognition module 132 (also called ANPR module) for interchanging the object identifier or for automatically reading the license plate number. The vehicle 104 contains, for example, an output and input unit in the form of an LED monitor, a smartphone or a navigation device as a display device 118 which is used to audiovisually output the information 112 transmitted by the traffic monitoring device 102.

The signal source processing or license plate number recognition module 132 is optionally used to forward information to a restricted group of receivers or transmitters. When using smartphones or navigation devices, the license plate number can also be assigned, for example, using a cellphone number. The frequency at which data are transmitted between the vehicle 104 and the traffic monitoring device 102 can vary depending on the output device. For example, a frequency for infrastructure-to-vehicle or vehicle-to-vehicle communication, as stipulated by automobile manufacturers, is used for this purpose.

Figure 2:
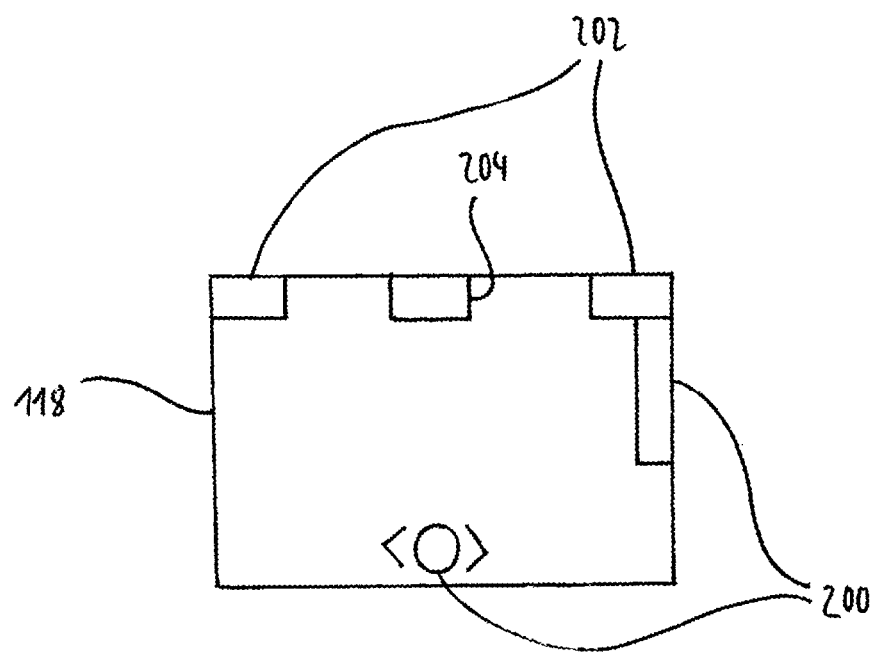
FIG. 2 shows a schematic illustration of a display device from FIG. 1.

FIG. 2 shows a schematic illustration of a display device 118 from FIG. 1. The display device 118 is a vehicle output and input unit. The display device 118 comprises, for example, an operating unit 200, a loudspeaker 202 for audio output and a microphone 204 for voice input.

The following warnings, for example, can be reproduced using the display device 118:

"Attention! 30 km/h zone! You are driving too fast!"

"Attention! TraffiSection! Your average speed is being monitored. You are currently driving 5 km/h too fast."

"Attention! Cellphone ban!"

"Attention! Too much weight! You must turn right!"

The warning mentioned last combines automatic reading of the license plate number for identifying the local language with a classification or weighing of the vehicle, for example. An item of information can therefore be alternately generated in different languages, for example. If image data are evaluated, for instance in order to check whether the driver is holding a cellphone to his ear, the warning "Attention! Cellphone ban!", for example, is transmitted to the display device 118 by the traffic monitoring device as information.

Figure 3:
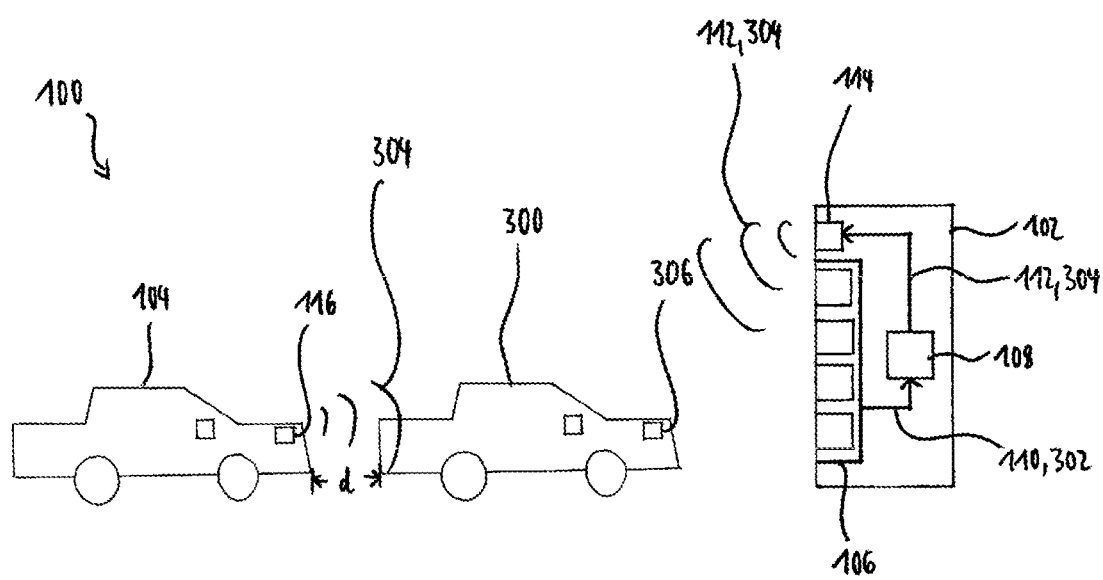
FIG. 3 shows a schematic illustration of a traffic monitoring system according to an exemplary embodiment.

FIG. 3 shows a schematic illustration of a traffic observation system 100 according to an exemplary embodiment. In contrast to FIG. 1, the sensor device 106 according to this exemplary embodiment is designed to also capture a further vehicle 300, here a vehicle traveling in front of the vehicle 104, for example. For this purpose, the sensor device 106 generates a further sensor signal 302 representing the further vehicle 300 and outputs said signal to the apparatus 108. The apparatus 108 is designed to generate a further item of information 304 using the further sensor signal 302 and to transmit it to a further vehicle interface 306 of the further vehicle 300 via the interface 114.

According to an exemplary embodiment, the sensor device 106 is designed to additionally determine a distance d between the vehicle 104 and the further vehicle 300 and a respective mass of the two vehicles 104, 300 in addition to speed measurement data relating to the two vehicles 104, 300. These data are processed by the apparatus 108. The information 112, 304 is then compiled and is transmitted to the vehicle interfaces 116, 306.

According to an exemplary embodiment, the information 112 is transmitted to the vehicle 104 and the further information 304 is transmitted to the further vehicle 300. Alternatively, the information 112 can be used to generate the further information 304 by means of further processing, for instance in an app. The further information 304 is therefore not forwarded by the traffic monitoring device 102 to the further vehicle interface 306 directly, but rather via the vehicle interface 116.

Figure 4:
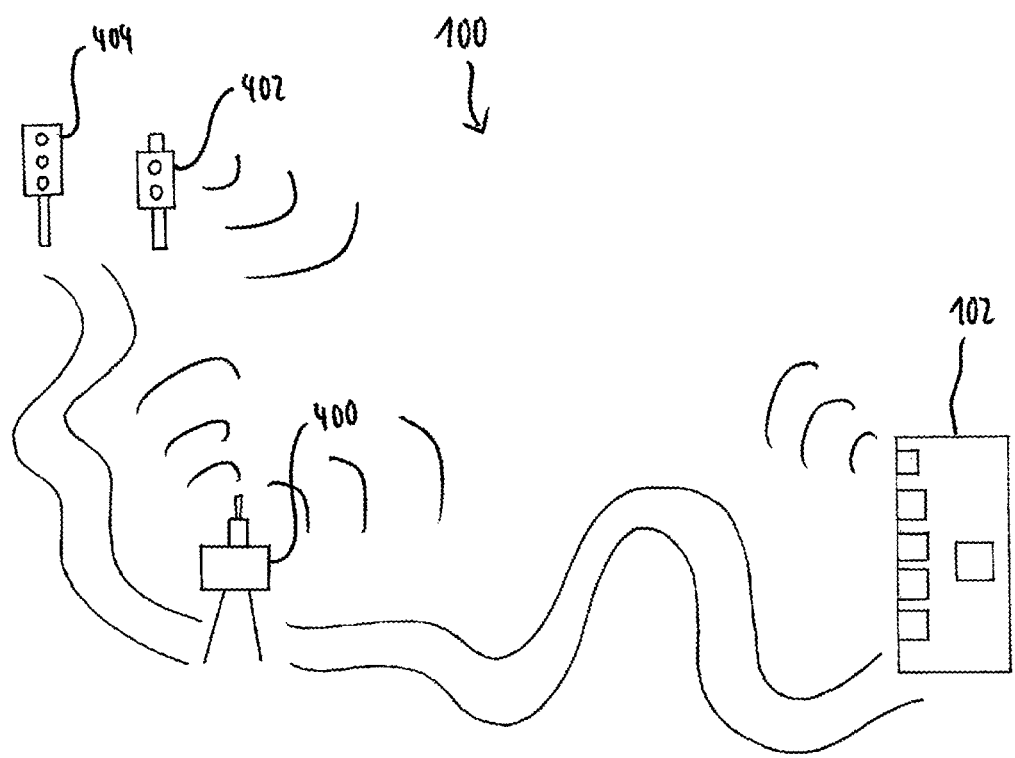
FIG. 4 shows a schematic illustration of a traffic monitoring system according to an exemplary embodiment.

FIG. 4 shows a schematic illustration of a traffic monitoring system 100 according to an exemplary embodiment. In contrast to a traffic monitoring system described above on the basis of FIGS. 1 to 3, the traffic monitoring system 100 shown in FIG. 4 comprises, in addition to the traffic monitoring device 102, a further traffic monitoring device 400, an additional traffic monitoring device 402 and a traffic light system 404, for example. The traffic monitoring devices 400, 402 and the traffic light system 404 can be networked both together and to the traffic monitoring device 102 for mutually interchanging information.

The further traffic monitoring device 400 is, for example, a mobile traffic monitoring device for monitoring speed. The additional traffic monitoring device 402 is used, for example, to monitor the red lights or traffic lights. The traffic monitoring devices shown in FIG. 4 may belong to different municipalities or cities, in particular.

If, for example, the traffic monitoring device 102 and the further traffic monitoring device 400 are each configured, for example, with a license plate number recognition module, but preferably also with a signal source processing module for locating signals, it is possible to detect repeated instances of minor speeding by a vehicle, that is to say speeding just above a permitted maximum speed, but below a trigger threshold value. For example, infrastructure-to-infrastructure communication between the relevant traffic monitoring devices can be used to output a warning to the relevant vehicle via vehicle-to-infrastructure communication, for instance the notification "You have been flashed since you have been repeatedly driving too fast at 51 km/h instead of 50 km/h!".

Figure 5:
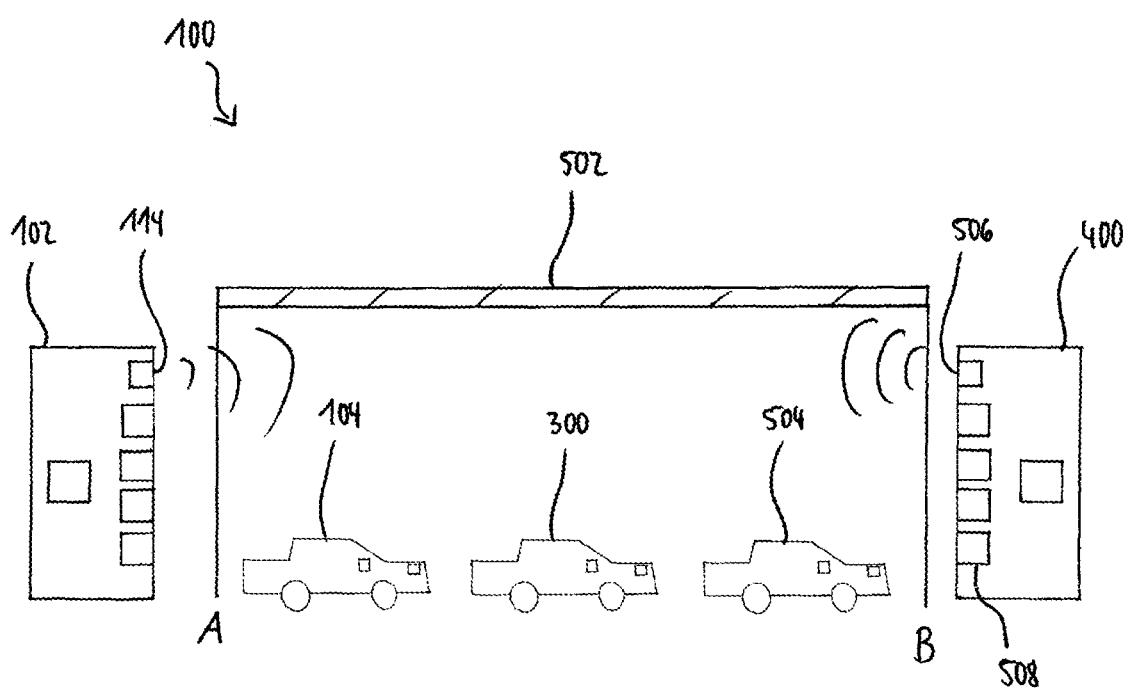
FIG. 5 shows a schematic illustration of a traffic monitoring system according to an exemplary embodiment.

FIG. 5 shows a schematic illustration of a traffic monitoring system 100 according to an exemplary embodiment. In contrast to FIGS. 1 to 4, the traffic monitoring system 100 according to this exemplary embodiment comprises the traffic monitoring device 102 and the further traffic monitoring device 400, here two stationary TraffiTowers which are installed at opposite ends of a tunnel 502 in order to capture vehicles driving through the tunnel 502, here the vehicle 104, the further vehicle 300 and an additional vehicle 504.

Route monitoring, also called point-to-point measurement or TraffiSection, is shown. For example, the traffic monitoring device 102 is in the entrance region A of the tunnel 502 and the further traffic monitoring device 400 is in the exit region B of the tunnel 502. The route monitoring is carried out in the tunnel 502. In a similar manner to the traffic monitoring device 102, the further traffic monitoring device 400 comprises a further interface 506 which is coupled to the interface 114 of the traffic monitoring device 102 in order to mutually interchange data using infrastructure-to-infrastructure communication. The further traffic monitoring device 400 also comprises, for example, a license plate number recognition module, but preferably also a signal source processing module 508 for locating signals for automatically recognizing any signal sources and/or license plate numbers. Signal source or license plate number recognition of the vehicles in the tunnel 502 is now carried out, for example, with the aid of the two traffic monitoring devices 102, 400.

For example, the following warnings are generated as information by the two traffic monitoring devices 104, 400 and are transmitted to the relevant vehicles in the tunnel 502 using infrastructure-to-vehicle communication:

"Attention! TraffiSection! Your average speed is being monitored. You are currently driving 5 km/h too fast!"

"Attention! Traffic jam !"

"Attention! Smog! Please switch off your engine!" This warning can be generated, in particular, in connection with exhaust gas monitoring in the tunnel 502.

"Attention! Your vehicle has not yet reached the tunnel exit. If you break down, we can help you." In this case, a corresponding item of information can be automatically generated, for example, by at least one of the two traffic monitoring devices 102, 400 using infrastructure-to-infrastructure communication and can be transmitted to a police station, for example.

It is also conceivable for information to be provided for a passenger, for example valuable information relating to possible construction measures, as continuous information, for instance for reading after the journey.

For example, the two traffic monitoring devices 102, 400 can be designed to measure an exact speed of the vehicles in the entrance region A and, if a predefined maximum speed is exceeded, to emit a warning in conjunction with a required speed adaptation to the relevant vehicles, for example "You must drive more slowly so that you do not exceed the average speed of 70 km/h.". Repeaters can be connected as external data transmission devices between individual point-to-point stations and can be designed to forward, for example, a tracking speed to a vehicle, for instance in the form of the notification "You are still driving too fast. You must drive at a maximum of 65 km/h.". A point-to-point route with two traffic monitoring devices having a tracking distance of 100 m each would have a length of 200 m, for example.

The advantage of the presence of a signal source processing module is the interchange of a unique object identifier which conforms to data protection as far as possible and is independent of the actual identity of the vehicle. The object identifier is preferably encrypted (for example hash with salt), provided with a time stamp and can in turn be included in an encrypted query procedure. The signal source processing module thus detects, for instance, a Bluetooth transmitter moving with a vehicle and uses the identifier of the Bluetooth transmitter without processing and/or to generate an at least temporarily unique object identifier of the vehicle, which is intended to be used for further communication between I2V and V2I. In conjunction with a wide variety of sensors, the vehicle together with the object identifier is tracked, that is to say seamlessly traced, with the aid of the locating signal. The tracking data may be logged in the form of a graphical distance-time representation. In the case of a speeding offense, it is possible to associate the object or signal identifier and an actual identity of the vehicle by triggering an exit image at point B. For this purpose, there is not necessarily any need for an entrance image A any longer which previously would have had to have been created according to the prior art without any initial suspicion. In addition, the object identifier forms, at least at the time of the exit B, a unique address which allows communication only between this address, or a plurality of addresses in the case of a plurality of vehicles, and the traffic monitoring device as I2V/V2I. Specially directed sensors or antennas are the prerequisite for separating the locating signals.

The object identifier may on the one hand be defined by the motor vehicle license plate number itself but, in times of increased data protection, also by the encrypted image or its result or from an identifier of the locating signal itself or from an identifier changed or assigned by means of random generation, for example.

In contrast to road sign recognition which can be displayed on a display in a vehicle, the connection between the vehicle and the traffic monitoring device according to an exemplary embodiment of the present invention is established by the traffic monitoring device, in particular in a wireless manner using a frequency and methods of car-to-car communication.

In this case, an image generated by the traffic monitoring device, for example, is emitted to the vehicle and is reproduced in the vehicle using a display device, for example in combination with information of all types, in particular with warnings, for example "Danger! School: speed limit 30" or "You have been flashed", possibly in conjunction with a photo of the driver captured during flashing or a further notification, for instance "Transmit provisional decision directly to the automobile or to the cellphone of the vehicle owner or driver".

Depending on the exemplary embodiment, information can be broadcast to further vehicles using car-to-car or car-to-environment communication, for example the notification "Flashing is used on this route".

Intervention in the engine management or control of the vehicle is optionally carried out via the traffic monitoring device.

It is also conceivable for hazard warnings to be transmitted as information from the traffic monitoring device directly to the vehicle, for example information relating to weather conditions ("Attention! Ice!"), location-based information, times for time-dependent bans, traffic signs or separate signs, images and sequences, such as on dialog displays (children, accidents, short scenes). It is also possible to record real-time video monitoring of a blind spot, for instance a cycle path, and to transmit it directly to the display device of the vehicle. Furthermore, notifications such as "Attention! Traffic turning right!", advertising messages, information relating to available parking spaces, statistics of the traffic monitoring device, for instance traffic jam data in the case of low speeds and low vehicle flow, or environmental data, for instance relating to local fine dust pollution, can be transmitted to the vehicle via the traffic monitoring device. It is also conceivable to transmit warnings of vehicles driving in the wrong direction.

According to another exemplary embodiment, the traffic monitoring device reads in speed and sensor data relating to the vehicle, for instance sensor data from a rain sensor of the vehicle. The sensors of the vehicle can be double-checked using these data by comparison with the sensor device of the traffic monitoring device. The signals from the sensor device can be compared, for example, with data from calibrated sensors of the vehicle, wherein the traffic monitoring device can output a corresponding error log to the vehicle.

An image of a driver of the vehicle which is recorded by the traffic monitoring device can be transmitted, for example on request by the vehicle, from the traffic monitoring device to the vehicle. The image retrieved in this manner can be used, for example, by taxi companies, bus drivers or truck drivers as evidence of driving times, by motor vehicle insurance companies as evidence of driving practice or by car-sharing agencies as evidence of correct transportation, in particular relating to a number of occupants.

The information can be generated, for example, using at least two threshold values. For example, a first item of information is emitted to the vehicle if the vehicle reaches a first speed, and a second item of information is emitted to the vehicle if the vehicle reaches a second speed.

In order to adhere to maximum permissible bridge loads, the vehicle can be classified or weighed according to conventional methods. An origin of the driver, for example, can be inferred by means of the traffic monitoring device in combination with automatic license plate number recognition. If necessary, a corresponding assignment to a local language is additionally carried out. The traffic monitoring device can therefore generate, for example, a notification such as "Attention! Your vehicle is too heavy! Please turn right!" in the respective local language of the driver.

The traffic monitoring device can be optionally used in the context of breakdown detection, for instance in the region of a point-to-point route, possibly in combination with license plate number recognition.

The information generated by the traffic monitoring device is preferably output only to the respectively affected road user according to an exemplary embodiment. This is carried out, for example, by recognizing the license plate number and registering the respective affiliation of the output device or by combining the license plate number recognition with a cellphone number of a smartphone on which a suitable app for communicating with the traffic monitoring device is installed.

A plurality of traffic monitoring devices can be networked to one another. As a result, successive speeding offenses by the same vehicle and the same driver at different successive locations can be penalized, for example.

Optionally, the traffic monitoring device can output a speed recommendation to a variable traffic sign system or vice versa. For this purpose, weather data captured by means of a rain sensor or an external data source of meteorological services, speed statistics and further measurements by the traffic monitoring device can be transmitted, for instance.

In the event of an accident for example, monitoring data which have been recorded by the traffic monitoring device, for instance in the form of a video, can be retrieved using a corresponding app. The monitoring data are retrieved in a vehicle-dependent manner, for example.

Facial recognition by the traffic monitoring device is also conceivable. In this case, corresponding data can be transmitted in encrypted form to particular authorized groups of people, for instance the police, for example using special frequencies.

The traffic monitoring device optionally compares data with the central traffic register.

According to another exemplary embodiment, the traffic monitoring device is designed to communicate with an external data transmission device, for instance an adjacent cellphone mast, for instance in order to detect whether a driver is not only holding a cellphone to his ear while driving, but is also actually making a telephone call with it. For this purpose, the cellphone number can be compared, for example, with the license plate number of the vehicle. Optionally, the traffic monitoring device in this case transmits a corresponding warning, for instance "Attention! Cellphone ban!", "Please hang up!" or "Fine payable", to the vehicle or the cellphone.

In addition, the traffic monitoring device can be networked to a traffic light system. In this case, red phases can also be monitored in addition to red light violations. If the traffic monitoring device is, for example, in the immediate environment of the traffic light monitoring, for instance at a distance of 1 km, the traffic monitoring device can transmit a speed recommendation to use a green phase, for instance, as information to the vehicle using the traffic light monitoring, for instance "Attention! Red light monitoring! Recommendation: 42 km/h!".

Figure 6:
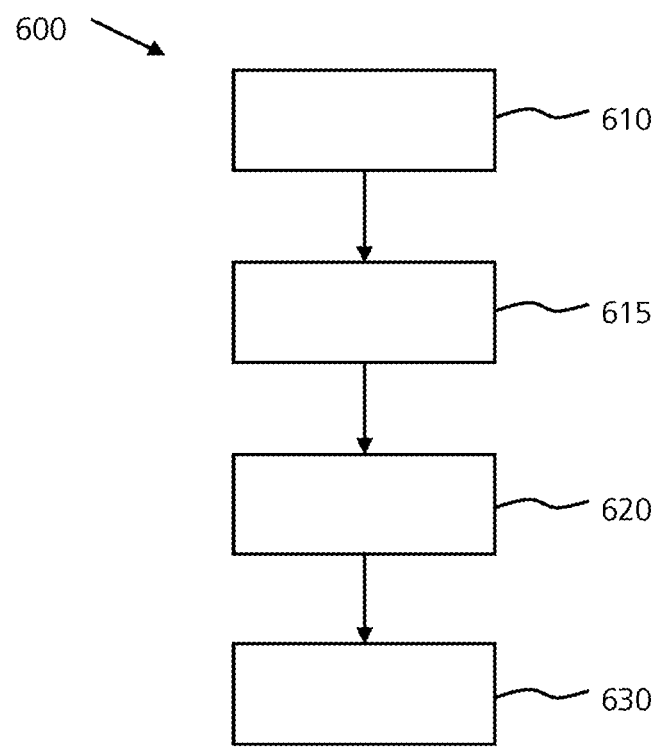
FIG. 6 shows a flowchart of a method for operating a traffic monitoring device according to an exemplary embodiment.

FIG. 6 shows a flowchart of a method 600 for operating a traffic monitoring device according to an exemplary embodiment. The method 600 can be carried out or controlled, for example, in connection with a traffic monitoring device described above using FIGS. 1 to 5. In this case, the sensor signal provided by the sensor device is read in in a step 610. In a further step 620, the information is generated using the sensor signal. Finally, the information is output to the interface to the vehicle in a step 630.

Figure 7:
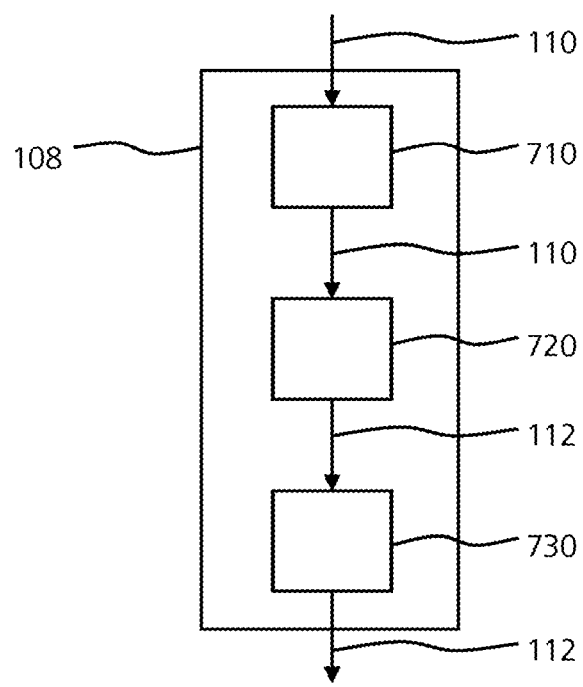
FIG. 7 shows a schematic illustration of an apparatus for operating a traffic monitoring device according to an exemplary embodiment.

FIG. 7 shows a schematic illustration of an apparatus 108 according to an exemplary embodiment, for instance an apparatus as described above using FIGS. 1 to 5. The apparatus 108 comprises a reading-in unit 710 for reading in the sensor signal 110 provided by the sensor device, a generation unit 720 for generating the information 112 using the sensor signal 110 and an output unit 730 for outputting the information 112 to the interface to the vehicle.

The exemplary embodiments described and shown in the figures have been selected only by way of example. Different exemplary embodiments can be combined with one another completely or with regard to individual features. An exemplary embodiment can also be supplemented with features of a further exemplary embodiment.

Method steps according to the invention can also be carried out repeatedly and in a sequence other than that described.

If an exemplary embodiment comprises an "and/or" conjunction between a first feature and a second feature, this should be read such that the exemplary embodiment has both the first feature and the second feature according to an embodiment and has either only the first feature or only the second feature according to another embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claim

What is claimed is:

1. A method for operating a traffic monitoring device, the method comprising: reading in at least one sensor signal provided by a sensor device of the traffic monitoring device, wherein a signal representing a license plate number of a vehicle is read in as the at least one sensor signal; interchanging an at least temporarily unique, encrypted object identifier of the vehicle between a vehicle interface and an interface of the traffic monitoring device and interchanging keys;
   generating an item of information using the at least one sensor signal; outputting the item of information via the interface of the traffic monitoring device to the vehicle and/or a computer unit; and assigning the license plate number to at least one local language using the sensor signal, wherein the item of information is generated based of the local language in the generating step.

2. The method as claimed in claim 1, wherein a further signal from a signal source on or in the vehicle is read in as a locating signal, and wherein the locating signal is tracked and recorded over a distance.

3. The method as claimed in claim 1, wherein at least one of an image, an image sequence or a warning is generated as the item of information in the generating step.

4. The method as claimed in claim 1, wherein a control signal for controlling the vehicle is also generated in the generating step using the sensor signal, and wherein the control signal is output via the interface of the traffic monitoring device in the outputting step.

5. The method as claimed in claim 1, wherein the item of information is output via the interface of the traffic monitoring device in the outputting step in order to transmit the item of information to at least one further traffic monitoring device or at least one external data transmission device, and wherein at least one signal provided by the vehicle or the further traffic monitoring device or the external data transmission device is also read in in the reading-in step, wherein the item of information is also generated using the at least one signal in the generating step.

6. The method as claimed in claim 5, further comprising: comparing the at least one signal with the at least one sensor signal to determine a difference between the at least one signal and the at least one sensor signal, wherein the item of information is generated based on the difference in the generating step.

7. The method as claimed in claim 1, wherein at least one further sensor signal provided by the sensor device is read in in the reading-in step, wherein at least one further item of information is generated in the generating step using the further sensor signal, wherein the further item of information is output via the interface of the traffic monitoring device in the outputting step in order to transmit the further item of information to at least one further vehicle.

8. An apparatus comprising:
   a processor; and
   a memory storing instructions that, when executed, cause the apparatus to carry out the method as claimed in claim 1.

9. A traffic monitoring device comprising:
   a sensor device for capturing at least one vehicle; and
   the apparatus as claimed in claim 8.

10. A traffic monitoring system comprising:
   the traffic monitoring device as claimed in claim 9; and
   the vehicle that is coupled to the traffic monitoring device via the interface of the traffic monitoring device for transmitting the item of information.

11. A non-transitory computer readable medium storing a control program to have a computer carry out the method as claimed in claim 1.

* * * * *